United States Patent
Ema

(10) Patent No.: US 9,558,091 B2
(45) Date of Patent: Jan. 31, 2017

(54) INFORMATION PROCESSING DEVICE, FAULT AVOIDANCE METHOD, AND PROGRAM STORAGE MEDIUM

(71) Applicant: NEC Corporation, Tokyo (JP)

(72) Inventor: Tamae Ema, Tokyo (JP)

(73) Assignee: NEC CORPORATION, Tokyo (JP)

( * ) Notice: Subject to any disclaimer, the term of this patent is extended or adjusted under 35 U.S.C. 154(b) by 116 days.

(21) Appl. No.: 14/499,272

(22) Filed: Sep. 29, 2014

(65) Prior Publication Data

US 2015/0095698 A1 Apr. 2, 2015

(30) Foreign Application Priority Data

Sep. 27, 2013 (JP) .................................. 2013-201451
Sep. 1, 2014 (JP) .................................. 2014-176924

(51) Int. Cl.
*G06F 11/30* (2006.01)
*G06F 11/00* (2006.01)
*G06F 11/07* (2006.01)

(52) U.S. Cl.
CPC ............. *G06F 11/30* (2013.01); *G06F 11/008* (2013.01); *G06F 11/0715* (2013.01); *G06F 11/0757* (2013.01)

(58) Field of Classification Search
USPC ........................................................ 714/47.1
See application file for complete search history.

(56) References Cited

U.S. PATENT DOCUMENTS

| | | | | |
|---|---|---|---|---|
| 5,129,080 A | * | 7/1992 | Smith | G06F 11/142 714/4.1 |
| 7,725,901 B2 | * | 5/2010 | Gissel | G06F 9/5083 707/705 |
| 2007/0006212 A1 | * | 1/2007 | Kawamoto | G06F 11/1482 717/170 |
| 2007/0067663 A1 | * | 3/2007 | Surasinghe | G06F 11/1482 714/4.1 |
| 2009/0172674 A1 | * | 7/2009 | Bobak | G06F 11/1482 718/101 |
| 2009/0172689 A1 | * | 7/2009 | Bobak | G06F 9/5061 718/104 |
| 2010/0185903 A1 | * | 7/2010 | Horn | G06F 11/004 714/51 |
| 2012/0174114 A1 | * | 7/2012 | Matsumoto | G06F 11/3423 718/104 |
| 2012/0185737 A1 | * | 7/2012 | Ishiou | G06F 11/0751 714/48 |

(Continued)

*Primary Examiner* — Kamini Patel
(74) *Attorney, Agent, or Firm* — Young & Thompson

(57) ABSTRACT

An information processing device includes a detection unit and an avoidance unit. The detection unit monitors one or both of a utilization rate of memory capacity allocated to a process, and a processing time to take to process a request. The detection unit detects a state where a fault is likely to occur in the information processing device, based on the monitoring result. The avoidance unit executes fault avoidance processing when the state where the fault is likely to occur is detected. The fault avoidance processing is processing that lowers an upper limit number of threads from a standard value to a limit value that is less than the standard value, and extends a waiting time of a thread from a standard time to an extended time that is longer than the standard time.

11 Claims, 8 Drawing Sheets

(56) References Cited

U.S. PATENT DOCUMENTS

| | | | |
|---|---|---|---|
| 2013/0111484 A1* | 5/2013 | Chen | G06F 11/0757 718/102 |
| 2013/0212592 A1* | 8/2013 | Strom | G06F 9/546 718/103 |
| 2014/0019989 A1* | 1/2014 | Suzuki | G06F 9/5088 718/105 |
| 2014/0089736 A1* | 3/2014 | Okada | G06F 11/2736 714/31 |
| 2014/0143790 A1* | 5/2014 | Kurihara | G06F 9/4881 718/105 |
| 2015/0007187 A1* | 1/2015 | Shows | G06F 9/5088 718/104 |
| 2015/0257021 A1* | 9/2015 | Curley | H04W 24/08 709/224 |
| 2015/0370623 A1* | 12/2015 | Wada | G06F 11/0721 714/37 |
| 2016/0077889 A1* | 3/2016 | Falco | G06F 9/52 718/106 |

* cited by examiner

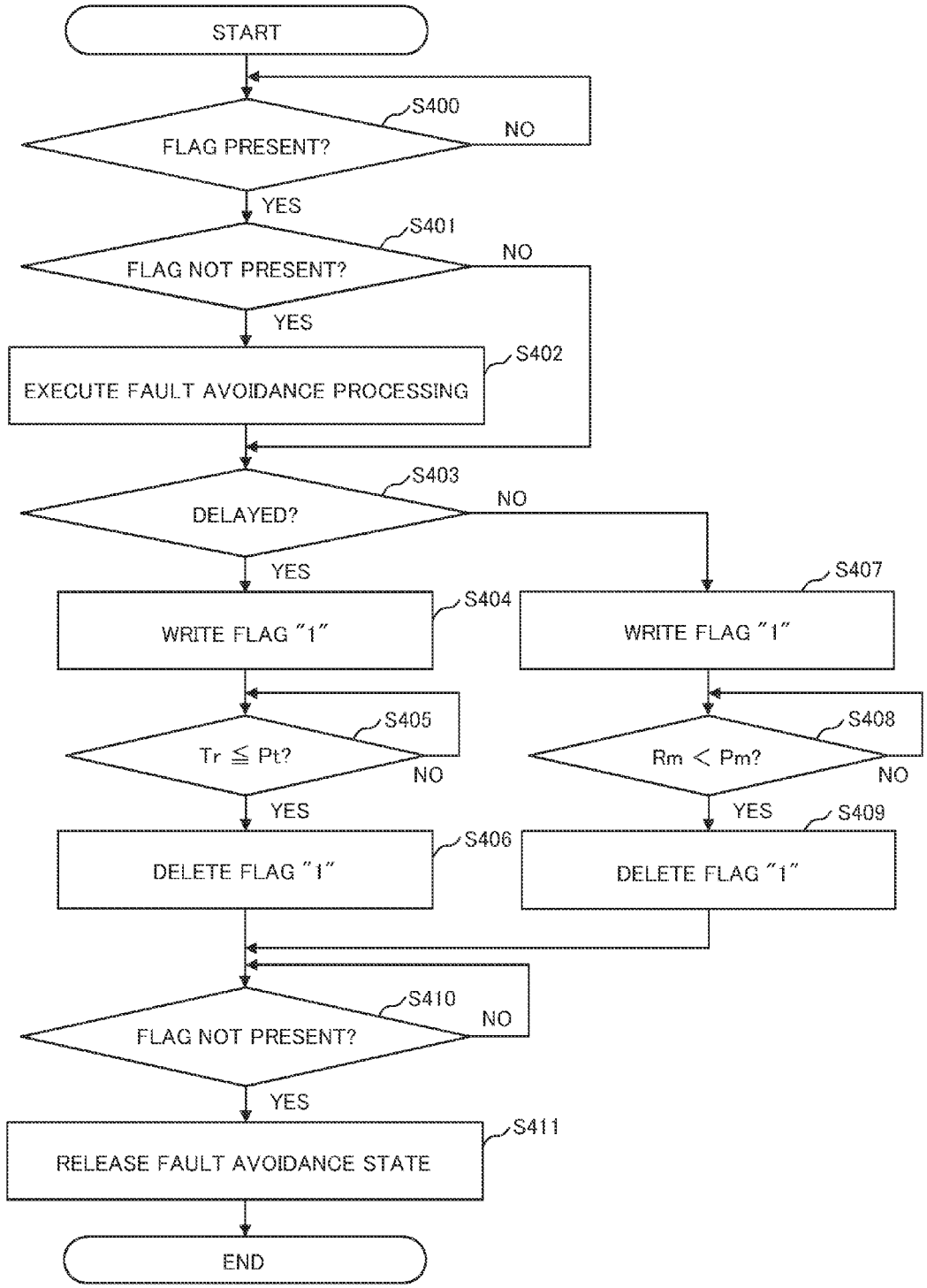

INFORMATION PROCESSING DEVICE, FAULT AVOIDANCE METHOD, AND PROGRAM STORAGE MEDIUM

This application is based upon and claims the benefit of priority from Japanese Patent Application No. 2013-201451, filed, on Sep. 27, 2013 and Japanese Patent Application No. 2014-176924, filed on Sep. 1, 2014, the disclosures of which are incorporated herein in its entirety by reference.

TECHNICAL FIELD

The present invention relates to a technique that avoids a situation in which a fault occurs in a computer due to a processing delay or a memory shortage of the computer.

BACKGROUND ART

When an information processing device (computer), for example, executes a computer program (also referred to as a program for short), the information processing device generates a plurality of processes that are units in which the program is executed. In addition, the information processing device generates, in the process, a plurality of threads that are units in which processing is executed.

In this kind of information processing device, when processing of one thread for example within a process is delayed, this delay negatively affects processing of other threads within the same process. Thus, for example, a fault such as a process terminating in an abnormal manner is liable to occur in the information processing device.

Furthermore, the same fault of a process terminating in an abnormal manner is liable to occur in the information processing device as well when memory capacity allocated to a process is insufficient.

Reference Document 1 (Japanese Laid-open Patent Application Publication No. H10-049219) discloses a technique in which a computer detects a state where a fault is likely to occur in the computer. Reference Document 2 (Japanese Laid-open Patent Application Publication No. 2007-226399) discloses a technique in which garbage collection processing (hereinafter, also referred to as GC processing) is used for a computer to detect a state where a fault is likely to occur in the computer. GC processing is processing in which, when a memory region that is associated with processing of a program while executing the program remains associated with the processing of the program even after the program terminates, a computer cancels (releases) the association. In Reference Document 2, a computer detects a state where a fault is likely to occur in the computer by measuring a time interval in which CC processing is executed and increase in memory capacity after the GC processing, and comparing those measurement values with threshold values.

In Reference Document 3 (Japanese Laid-open Patent Application Publication No. 2008-077266) and Reference Document 4 (Japanese Laid-open Patent Application Publication No. 2008-250669), methods are disclosed in which an upper limit for the number of threads on a server is controlled based on a prediction value for a message processing time on the server. Furthermore, in Reference Documents 3 and 4, methods are also disclosed in which an upper limit for the number of terminals that respectively connect to a plurality of web servers is controlled based on processing state of requests in the plurality of web servers.

In Reference Documents 1 to 4, there is no description whatsoever of a technique that avoids a situation in which a fault occurs in a computer due to a delay in processing of a thread or a shortage of memory capacity allocated to a process.

SUMMARY

The main objective of the present invention is to provide a technique that avoids a fault in an information processing device (computer) caused by a delay in processing of a thread or a shortage of memory allocated to a process.

In other words, one aspect of the information processing device according to the present invention includes:

a detection unit that detects a state where a fault is likely to occur based on one or both of a utilization rate of memory capacity allocated to a process that is a unit in which a computer program is executed, and a processing time that is spent by a thread, which is generated by the process and is a unit in which processing corresponding to a request received by the process is executed, to perform the processing; and an avoidance unit that executes fault avoidance processing that lowers an upper limit for the number of the threads that are generated by the process and are able to belong to the process, from a standard value to a limit value that is less than the standard value, and extends a waiting time that the threads have to wait after completing processing until starting separate processing, from a standard time to an extended time that is longer than the standard time, when a state where a fault is likely occur is detected.

In one aspect of a fault avoidance method according to the present invention, a computer detects a state where a fault is likely to occur, based on one or both of a utilization rate of memory capacity allocated to a process, that is a unit in which a computer program is executed, and a processing time that spent by a thread, which is generated by the process and is a unit in which processing corresponding to a request received by the process is executed, to perform the processing, and the computer lowers an upper limit for the number of the threads that are generated by the process and are able to belong to the process, from a standard value to a limit value that is less than the standard value, and the computer extends a waiting time that the threads have to wait after completing processing until starting separate processing, from a standard time to an extended time that is longer than the standard time, when a state where a fault is likely to occur is detected.

BRIEF DESCRIPTION OF THE DRAWINGS

Exemplary features and advantages to the present invention will become apparent from the following detailed description when taken with the accompanying drawings in which:

FIG. 8 is a flowchart depicting an operation example of an avoidance unit in the fourth exemplary embodiment.

EXEMPLARY EMBODIMENTS

Hereinafter, exemplary embodiments according to the present invention are described with reference to the drawings.

First Exemplary Embodiment

Figure 1:
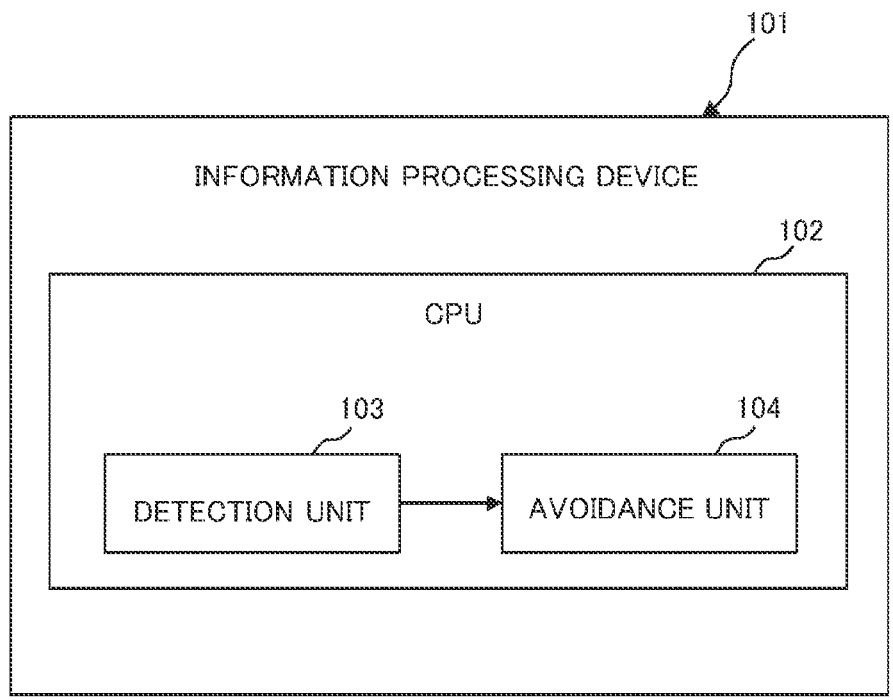
FIG. 1 is a block diagram depicting, in a simplified manner, a configuration of an information processing device of a first exemplary embodiment according to the present invention.

FIG. 1 is a block diagram depicting, in a simplified manner, configuration of an information processing device of a first exemplary embodiment according to the present invention. The information processing device 101 of the first exemplary embodiment is a computer provided with a central processing unit (CPU) 102, for example. The CPU 102 controls general operations of the information processing device 101 by reading a computer program (program) stored in a storage device (not illustrated) and executing the program.

In this first exemplary embodiment, the information processing device 101 (CPU 102) generates a plurality of processes that are units in which a program is executed. A process is one of function units of the CPU 102, and is provided with a function to manage an operation (processing) of the process. For example, a process (CPU 102) generates (sets) a thread that is a unit in which processing corresponding to a request received by the process is executed. Normally, the process is able to generate a plurality of threads because of executing a plurality of units of processing. An upper limit for the number of threads that the process is able to have is set in advance.

Furthermore, a memory (not illustrated) is built into the information processing device 101, and an available memory region (memory capacity) is allocated, to the process from the memory. From the allocated memory region, the process allocates a memory region (memory capacity) that is used by a thread.

In this first exemplary embodiment, the information processing device 101 includes a detection unit (detection means) 103 and an avoidance unit (avoidance means) 104 as function units that are implemented by the CPU 102 executing a program. The detection unit 103 is provided with a function to monitor one or both of a utilization rate of memory capacity allocated to the process, and a processing time spent from the time when the thread receives a request until completing processing corresponding to the request. In addition, the detection unit 103 is provided with a function to detect, based on the monitoring result, a state where a fault is likely to occur (hereinafter, also referred to as a fault concern state) in the information processing device 101 (CPU 102).

The avoidance unit 104 is provided with a function to execute fault avoidance processing when a state where the fault is likely to occur (fault concern state) is detected. The fault avoidance processing is processing that lowers an upper limit for the number of threads from a standard value to a limit value that is less than the standard value, and extends a thread waiting time from a standard time to an extended time that is longer than the standard time. The waiting time is the time for which the thread has to wait after completing processing until starting separate processing.

The information processing device 101 of this first exemplary embodiment is able to achieve the following advantageous effect by being provided with a configuration (function) as described above, in other words, in this first exemplary embodiment, the detection unit 103 detects the fault concern state based on one or both of the memory capacity utilization rate and the thread processing time. It is possible to indicate a memory shortage state by the memory capacity utilization rate, and to indicate a processing delay state of a process by the thread processing time. Main causes for a fault (a state where a normal operation is not possible) occurring in the information processing device 101 are that processing is delayed, and that memory capacity is insufficient. As described above, the information processing device 101 of this first exemplary embodiment is able to appropriately monitor the memory shortage state and the processing delay state by using one or both of the memory capacity utilization rate and the processing time. Thus, the information processing device 101 is able to accurately detect the fault concern state.

Furthermore, when detecting the fault concern state, the information processing device 101 lowers the upper limit for the number of threads and extends the thread waiting time, in other words, the information processing device 101 is able to suppress the number of threads that execute processing by lowering the upper limit for the number of threads, and is able to suppress the number of threads that are executed in parallel by extending the thread waiting time. Thus, the information processing device 101 is able to suppress load on the CPU 102 to improve the fault concern state. In other words, the information processing device 101 is able to achieve an effect of avoiding a situation in which the fault caused by the memory shortage or the processing delay occurs, without stopping an operation (while continuing an operation).

Second Exemplary Embodiment

Hereinafter, a second exemplary embodiment according to the present invention is described.

Figure 2:
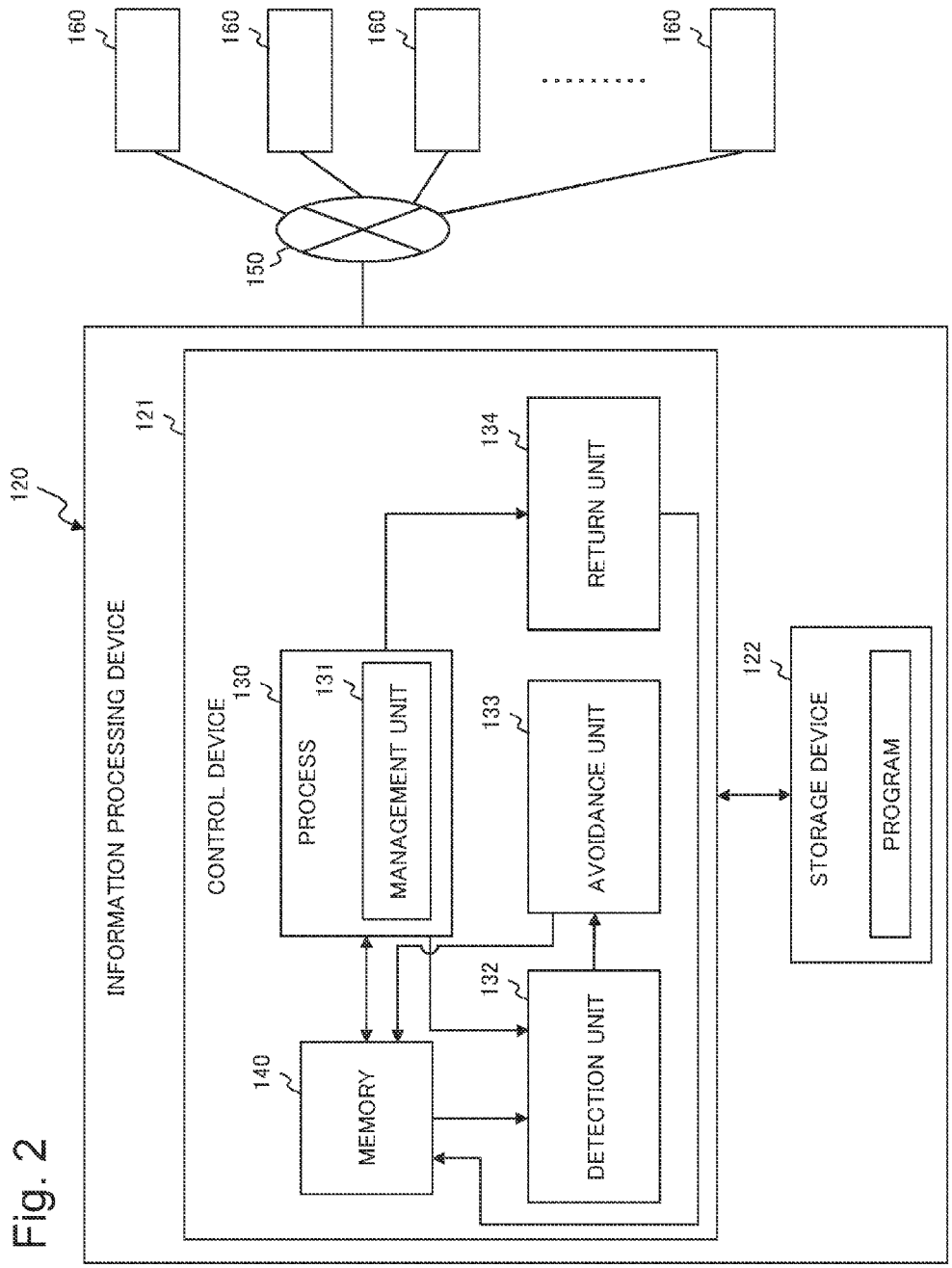
FIG. 2 is a block diagram depicting, in a simplified manner, a configuration of an information processing device of a second exemplary embodiment according to the present invention.

FIG. 2 is a block diagram depicting, in a simplified manner, configuration of an information processing device of the second exemplary embodiment. This information processing device 120 is an application server computer), and is able to communicate with a plurality of client terminals 160 via an information communication network 150. In FIG. 2, the information processing device 120 is depicted together with the information communication network 150 and the client terminals 160. The client terminal 160 is a personal computer or a personal digital assistant (PDA), for example.

The information processing device 120 of the second exemplary embodiment includes, broadly speaking, a control device 121 and a storage device 122. The storage device 122 is a storage medium that stores a computer program (program) and data. The control device 121 is provided with a CPU, for example, and controls general operations of the information processing device 120 by the CPU executing a computer program read from the storage device 122.

The control device 121 is provided with a function to generate, as function units, a plurality of processes 130 that are execution units for the program, when a program (an application program, for example) is executed. Note that only one process 130 is depicted in FIG. 2 in order to simplify the illustration.

When generated, the process 130 is provided with a function to generate a plurality of threads (not illustrated) that are units in which processing is executed. The number of threads when the process 130 first generates the threads is set in advance as an initial value.

The process 130 includes a management unit 131 that manages an operation of the process 130. For example, when a request is received from the client terminal 160 via the information communication network 150, the management unit 131 outputs the request directed to one waiting thread. The thread that receives the request executes processing corresponding to the request.

Furthermore, when a processing result (response) is received from the thread, the management unit 131 returns the processing result to the originating client terminal 160 that transmits the request.

In addition, when a request is received and there is no waiting thread, the management unit 131 generates a new thread. However, the upper limit for the number of threads that are able to belong to a process 130 is set in advance. Therefore, when the number of threads belonging to the process 130 reaches the upper limit, the management unit 131 is not able to generate a new thread. For this reason, when a request is received, there is no waiting thread, and a new thread is not able to be generated, the management unit 131 holds the request. Then, when the thread that completes processing and enters a waiting state arises, the management unit 131 outputs the request directed to the thread.

In addition, when there is the thread that enters the waiting state, and the number of threads that belong to the process 130 exceeds the initial value, the management unit 131 deletes the thread in the waiting state.

A memory 140 that is a storage medium is built into the control device 121. A storage region serving as heap memory is set in the memory 140. The control device 121 is provided with a function to allocate a usable storage region (capacity) to each of the processes 130 from the heap memory of the memory 140 as a process region, when the processes 130 are generated. Each process region stores therein data relating to the process 130 to which the region is allocated (associated). For example, each process region in the memory 140 stores therein the upper limit for the number of threads that are able to be generated in the associated process 130. Furthermore, each process region stores therein information regarding a thread waiting time. The thread waiting time is the time for which the thread has to wait after completing processing until starting separate processing. In addition, each process region stores therein information regarding storage capacity (memory capacity) of the region. In addition, each process region stores therein the number of threads that belong to each process. When the management unit 131 generates the thread or deletes the thread, the number of threads is updated by the management unit 131 that executes processing. In addition, the management unit 131 is provided with a function to, when generating the thread, allocate a region that the generated thread is able to use, from the process region of the memory 140 to the thread. Each process region stores therein information such as storage capacity (memory capacity) of the region allocated to each thread. Furthermore, the management unit 131 is provided with a function to, when the thread starts processing, write information indicating the time at which the processing is started, as a start time, in the process region allocated to the process 130 to which the thread that starts the processing belongs. In addition, each process region has the number of waiting processes written therein. The number of waiting processes is updated by the management unit 131.

In this second exemplary embodiment, the control device 121 additionally includes, as function units, a detection unit (detection means) 132, an avoidance unit (avoidance means) 133, and a return unit 134.

The detection unit 132 is provided, with a function to calculate a utilization rate of each process region in the memory 140 (memory capacity utilization rate), and a processing time of the thread of each process. As a specific example, the detection unit 132 reads, from the memory 140, information regarding a memory capacity M of the process region allocated to each process 130. Furthermore, in each process 130, the detection unit 132 calculates the total amount of memory capacity allocated to each thread, as a used capacity m. The detection unit 132 then calculates a ratio Rm (Rm=m÷M) of the used capacity m with respect to the memory capacity M of the process region associated with each process 130, as a memory capacity utilization rate. Calculation of the memory capacity utilization rate Rm is executed at each predetermined tune interval Th (600 seconds, for example).

Furthermore, when detecting that the thread completes processing based on management information of the management unit 131, the detection unit 132 calculates, as a processing time Tr, the time spent by the thread that completes the processing to perform the processing. In other words, the management unit 131 calculates the thread processing time Tr by subtracting the start time written in the memory 140 from a time at which the thread that completes processing completes the processing.

In addition, the detection unit 132 is provided with a function to use the calculated memory capacity utilization rate Rm or the thread processing time Tr to detect that the information processing device 120 is in a state where the fault is likely to occur (fault concern state). Specifically, the detection unit 132 determines whether or not the memory capacity utilization rate Rm calculated for each process 130 is equal to or greater than a predetermined, memory threshold value Pm (0.85 (85%), for example). The memory threshold value Pm is registered in advance in the memory 140.

Then, when determining that the memory capacity utilization rate Rm is equal to or greater than the memory threshold value Pm, the detection unit 132 detects that the information processing device 120 is in the fault concern state due to the memory shortage.

Furthermore, the detection unit 132 determines whether or not the calculated thread processing time Tr is equal to or greater than a predetermined delay threshold value Pt (40 seconds, for example). The delay threshold value Pt is registered in advance in the memory 140.

Then, when determining that the thread processing time Tr is equal to or greater than the delay threshold value Pt, the detection unit 132 detects that the information processing device 120 is in the fault concern state due to the processing delay.

Incidentally, even when the detection unit 132 detects the memory shortage or the processing delay indicating the fault concern state, there is a case where the memory shortage or the processing delay is temporary and does not lead to the fault. Taking this into consideration, in this second exemplary embodiment, the detection unit 132 is provided with a function to validate the detection. For example, when the fault concern state is detected based on the memory capacity utilization rate Rm, the detection unit 132 monitors the memory capacity utilization rate Rm over a predetermined memory validation period (for 300 seconds, for example). In this memory validation period, the detection unit 132 shortens a time interval in which the memory capacity utilization rate Rm is calculated. For example, instead of calculating the memory capacity utilization rate Rm for each time interval Th (600 seconds, for example), the detection unit 132 performs the calculation for each time interval Ts (60 seconds, for example), which is shorter than the time interval Th. In addition, the detection unit 132 compares the calculated memory capacity utilization rate Rm with a validation memory threshold value Ptm. The validation memory threshold value Ptm may be the same as the memory threshold value Pm or may be different. As an example, the validation memory threshold value Ptm is set as a higher value (0.9 (90%), for example) than the memory threshold value Pm (0.85 (85%), for example).

When determining during the memory validation period that the memory capacity utilization rate Rm does not become equal to or greater than the validation memory threshold value Ptm, the detection unit 132 determines that it is temporary to be in a state where the memory capacity utilization rate Rm increases to a value equal to or greater than the memory threshold value Pm. In contrast, when determining during the memory validation period that the memory capacity utilization rate Rm is equal to or greater the validation memory threshold value Ptm, the detection unit 132 determines that the fault is liable to occur in the information processing device 120 due to the memory shortage. In other words, the detection unit 132 confirms the detection (determination) of the fault concern state.

Furthermore, when the fault concern state is detected based on the thread processing time Tr, the detection unit 132 performs monitoring in order to validate the thread processing time Tr over a predetermined delay validation period (for 300 seconds, for example). For example, also in the delay validation period, the detection unit 132 calculates the processing time Tr spent by a thread completes processing to perform the processing, and compares the processing time Tr with a delay threshold value Pt, in the same manner as previously described. Then, when here is no thread in which the processing time Tr becomes equal to or greater than the delay threshold value Pt during the delay validation period, the detection unit 132 determines that processing of the thread is merely temporarily delayed.

In contrast, when detecting that there is a thread. In which the processing time Tr becomes equal to or greater than the delay threshold value Pt during the delay validation period, the detection unit 132 determines whether or not the entirety of the process 130 to which the delayed thread belongs is in the delayed state. For example, the detection unit 132 reads, from the memory 140, the total number of threads Sa belonging to the process (validation target process) 130 to which the delayed thread belongs. Furthermore, the detection unit 132 reads, from the memory 140, the number of waiting threads St (waiting state for a request) that are threads belonging to the validation target process 130. The detection unit 132 then calculates, as a waiting ratio, a ratio Rs (Rs=St÷Sa), which is the number of waiting threads St with respect to the total number of threads Sa, and compares the waiting ratio Rs with a predetermined thread threshold value Ps (0.1 (10%), for example). When the waiting ratio Rs is less than the thread threshold value Ps, the detection unit 132 determines that the entire processing of the validation target process has a tendency to be delayed. In other words, the detection unit 132 confirms the detection (determination) of the fault concern state.

The avoidance unit 133 is provided with a function to execute processing that avoids the fault (fault avoidance processing) when the detection unit 132 confirms the determination of the fault concern state. In this second exemplary embodiment, the avoidance unit 133 executes, as fault avoidance processing, processing that lowers the upper limit for the number of threads and extends the thread waiting time. In other words, in the memory 140, a standard value (30, for example) of the upper limit for the number of threads and a limit value (20, for example) that is less than the standard value are registered in advance in a storage region separate from the storage region storing the upper limit for the number of threads referred to by the management unit 131. Note that appropriate numerical values considering content of an application program, performance of the control device 121, and the like are set for the standard value and the limit value. Furthermore, when the process is generated, the standard value is written in the process region in the memory 140 as the upper limit for the number of threads that is referred to by the management unit 131.

As fault avoidance processing, the avoidance unit 133 alters the upper limit for the number of threads in the memory 140 from the standard value (30, for example) to the limit value (20, for example).

In addition, in the memory 140, a standard time (0 second, for example) for the waiting time and an extended time (5 seconds, for example) that is longer than the standard time are registered in advance in a storage region separate from the storage region storing the thread waiting time referred to by the management unit 131. Note that appropriate times considering performance of the control device 121 and the like are set for the standard time and the extended time. Furthermore, when the process is generated, the standard time is written in the process region in the memory 140 as the thread waiting time referred to by the management unit 131.

As fault avoidance processing, the avoidance unit 133 alters the thread waiting time in the memory 140 from the standard time (0 second, for example) to the extended time (5 seconds, for example).

The management unit 131 of the process 130 manages generation of threads and processing start timing of threads while referring to information regarding the upper limit for the number of threads and the waiting time that are registered in the memory 140.

As mentioned above, since the upper limit for the number of threads and the waiting time referred to by the management unit 131 are altered by the avoidance unit 133, the number of threads belonging to the process 130 is suppressed, and the thread waiting time increases. Therefore, the number of threads executing processing in parallel decreases, and then the load on the information processing device 120 is suppressed. Thus, the information processing device 120 (avoidance unit 133) is able to avoid occurrence of the fault caused by the memory shortage or the processing delay.

The return unit 134 is provided with a function to return a portion that is altered by fault avoidance processing to the original state, after the avoidance unit 133 executes fault avoidance processing. In other words, when fault avoidance processing is executed based on the memory capacity utilization rate Rm, the return unit 131 monitors the memory capacity utilization rate Rm in the same manner as the detection unit 132. Then, when detecting that the memory capacity utilization rate Rm is less than the memory threshold value Pm, the return unit 134 returns the upper limit for the number of threads to the standard value, and returns the thread waiting time to the standard time. Furthermore, when fault avoidance processing is executed based on the thread processing time Tr, the return unit 134 monitors the thread processing time Tr in the same manner as the detection unit 132. Then, when detecting that the thread processing time Tr is shorter the delay threshold value Pt, the return unit 134 returns the upper limit for the number of threads to the standard value, and returns the thread waiting time to the standard time.

As in the first exemplary embodiment, the information processing device 120 of this second exemplary embodiment is able to achieve the effect of suppressing a situation in which the fault caused by the memory shortage or the processing delay occurs.

Furthermore, in this second exemplary embodiment, the information processing device 120 is provided with a function to validate the detection result, when detecting to be in the fault concern state. Therefore, it is possible to increase accuracy for detecting the fault concern state.

In addition, as fault avoidance processing, the information processing device 120 executes processing that lowers the load without stopping an operation (while continuing an operation) by suppressing the upper limit for the number of threads and extending the thread waiting time. Therefore, the fault avoidance processing in the information processing device 120 is very effective for an information processing device in which a continuous operation is desired. In addition, the time interval Ts for the detection unit 132 to calculate the memory capacity utilization rate Rm during the validation period is shorter than the normal time interval Th. Thus, the information processing device 120 (detection unit 132) is able to promptly validate the memory shortage state. Furthermore, since the time interval to calculate the memory capacity utilization rate Rm is made longer for a period other than the validation period, in the information processing device 120 (detection unit 132), the load on the information processing device 120 is able to be prevented from increasing.

Third Exemplary Embodiment

Hereinafter, the third exemplary embodiment according to the present invention is described. Note that, in the third exemplary embodiment, the same reference symbols are appended to portions having the same names as in the second exemplary embodiment, and overlapping descriptions of those common portions are omitted.

In this third exemplary embodiment, the avoidance unit 133 executes fault avoidance processing when detection of the fault concern state based on the memory capacity utilization rate Rm and detection of the fault concern state based on the thread processing time Tr are confirmed within a predetermined time by the detection unit 132.

A configuration (function) other than the aforementioned in the information processing device 120 of the third exemplary embodiment is the same as in the second exemplary embodiment. The information processing device 120 of this third exemplary embodiment is also able to achieve the same effect as in the second exemplary embodiment.

Furthermore, when detecting both of the memory shortage and the processing delay that may lead to the fault within a predetermined time, the information processing device 120 of this third exemplary embodiment executes fault avoidance processing. Therefore, the information processing device 120 carries out fault avoidance processing when a risk of the fault occurrence is higher.

Note that in the second and third exemplary embodiments, the detection unit 132 is able to detect both of the memory shortage and the processing delay. In contrast, the detection unit 132 may be configured so as to detect either the memory shortage or the processing delay. In this case, processing of the detection unit 132 is able to be reduced.

Furthermore, in addition to the second or the third exemplary embodiment, the control device 121 may be provided with a function to acquire information relating to the fault. For example, prior to the avoidance unit 133 executing fault avoidance processing due to the thread processing delay or the memory shortage detected by the detection unit 132, the control device 121 acquires information relating to the fault such as the following. Specifically, when the thread processing delay is detected, the control device 121 acquires a stack trace of the delayed thread. Furthermore, when the memory shortage is detected, the control device 121 acquires a dump (state information) of the memory 140 at that time. In this way, the avoidance unit 133 executes fault avoidance processing after the information is acquired.

Fourth Exemplary Embodiment

Hereinafter, a fourth exemplary embodiment is described.

Figure 3:
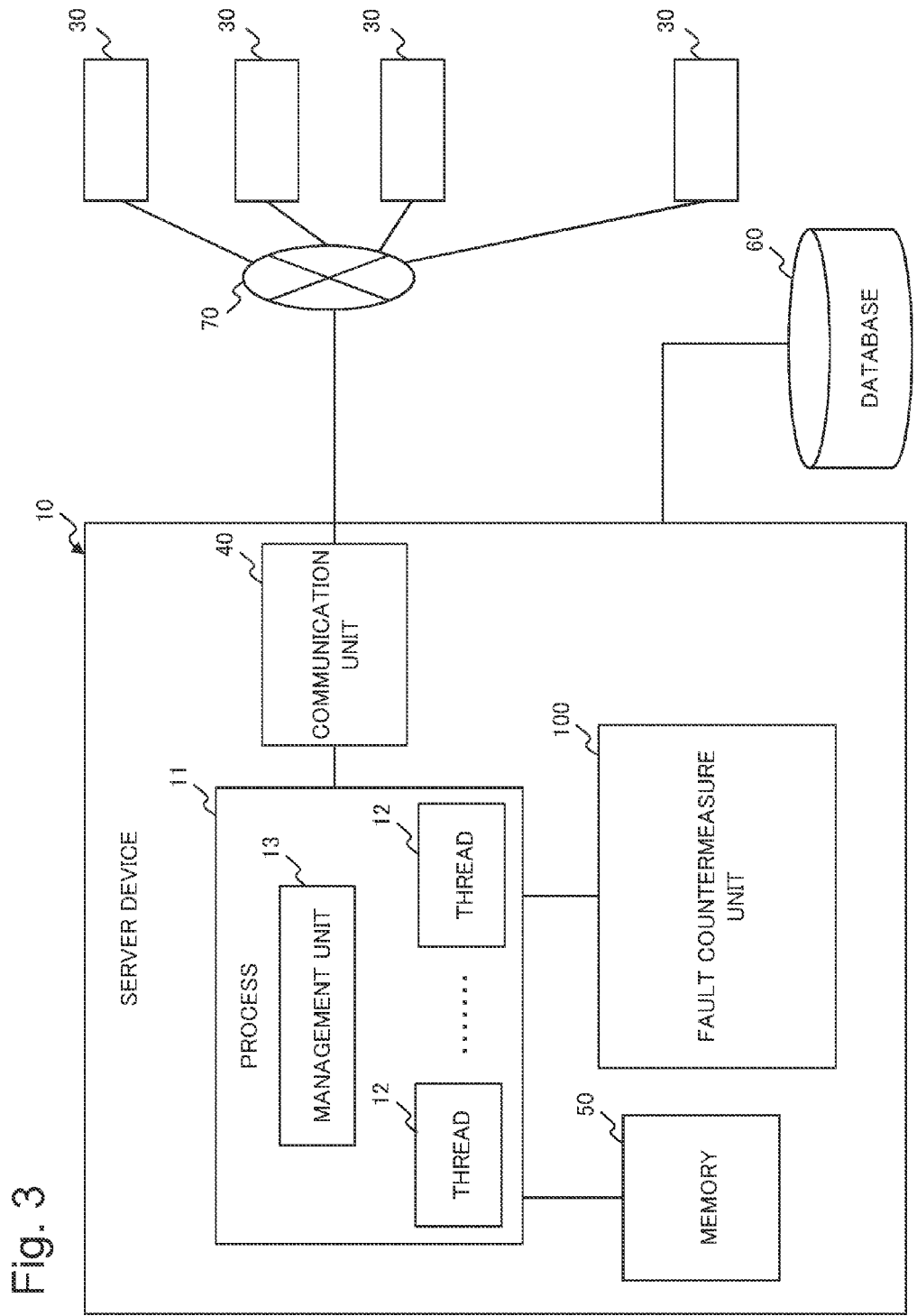
FIG. 3 is a block diagram depicting, in a simplified manner, configuration of an information processing device of a fourth exemplary embodiment.

FIG. 3 is a block diagram depicting, in a simplified manner, configuration of an information processing device of the fourth exemplary embodiment. The information processing device of this fourth exemplary embodiment is a server device (computer) 10, and is connected to a plurality of client terminals 30 via an information communication network (network) 70. Furthermore, the server device 10 is connected to a database 60.

The client terminal 30 includes input means such as a keyboard for a user to input information, and output means such as a display for displaying various kinds of information. For example, a personal computer, a tablet-type terminal, and a personal digital assistant (PDA) terminal are considered as the client terminal 30, however, the client terminal 30 is not limited thereto.

The server device 10 includes a communication unit 40, and the server device 10 carries out transmission and reception of data with the client terminal 30 by means of the communication unit 40.

The server device 10 additionally includes a CPU, for example, and includes a process 11 and a fault countermeasure unit 100 as function units implemented by the CPU. In addition, the server device 10 includes a memory 50 that is a storage medium.

The process 11 is an execution unit of a computer program (program), and is generated when the program is executed. A dedicated storage region is allocated in the memory 50 to the generated process 11. Although a plurality of processes 11 are normally generated in the server device 10, only one process 11 is depicted in order to simplify the illustration.

The process 11 includes a management unit 13. This management unit 13 is provided with a function to manage an operation of the process 11. For example, when the process is activated, the management unit 13 generates a plurality of threads 12 in a waiting state that are fixed in advance as an initial value. Furthermore, the management unit 13 attaches, to each thread. 12, thread identification information for identifying each thread 12. In addition, the management unit 13 allocates a storage region having a predetermined capacity to each of the generated threads 12 from the storage region in the memory 50 allocated to the process 11.

Figure 4:
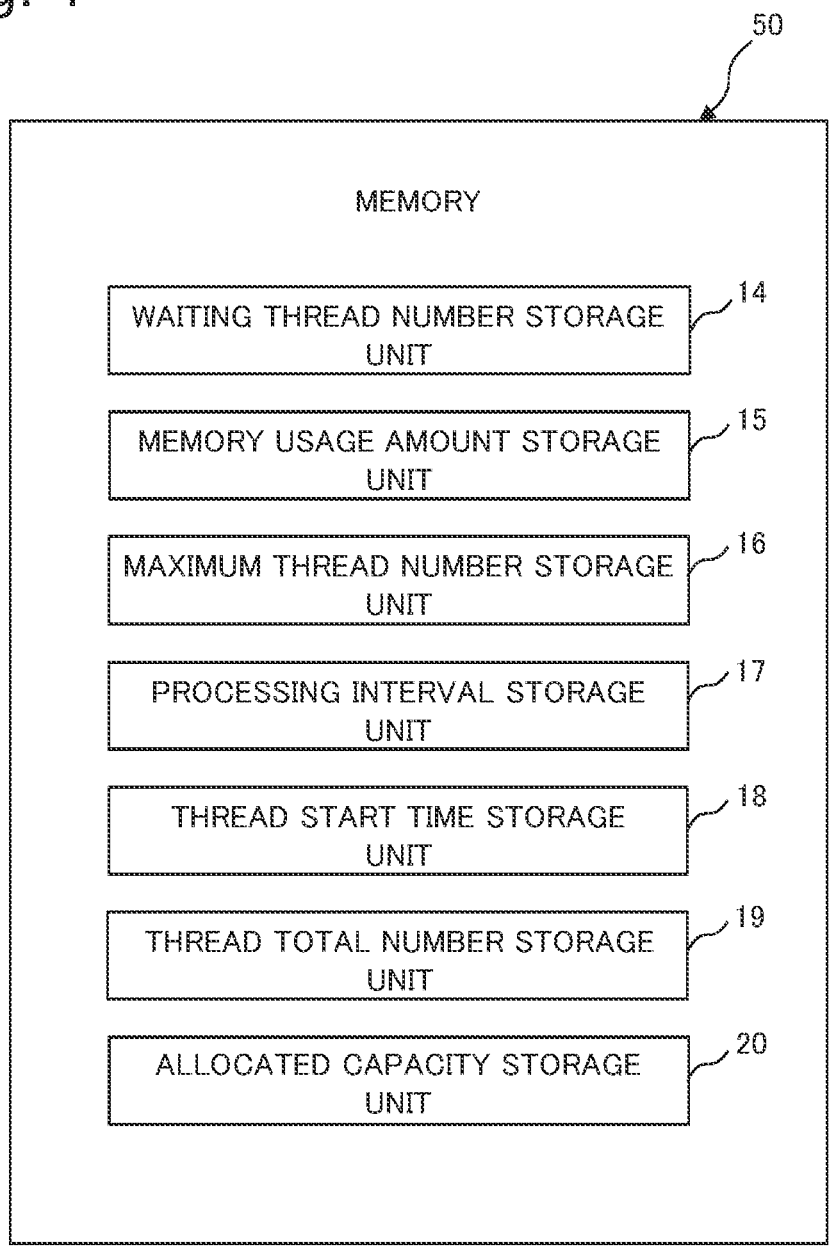
FIG. 4 is a diagram illustrating an example of a storage unit provided in a memory, in the fourth exemplary embodiment.

Moreover, a storage unit that stores data relating to the process 11 as depicted in FIG. 4 is set in the memory 50. The management unit 13 writes the number of the threads 12 belonging to the process 11, in a thread total number storage unit 19 as the total number of threads. Furthermore, the management unit 13 writes the number of the waiting threads 12 among the threads 12 belonging to the process 11, in a waiting thread number storage unit 14 as the number of waiting threads. In addition, the management unit 13 writes a storage capacity of a storage region within the memory 50 allocated to the process 11, in an allocated capacity storage unit 20 as an allocated capacity. In addition, the management unit 13 writes a value obtained by totalizing the capacity of the storage region allocated to each thread 12 from the allocated capacity allocated to the process 11, in a memory usage amount storage unit 15 as a memory usage amount.

There is also a case where the management unit 13 generates (adds) a thread 12 when necessary. In this case, the management unit 13 allocates a storage region to the added thread. 12 from the storage region allocated, to the process 11 in the memory 50. Furthermore, the management unit 13 updates the total number of threads stored in the thread total number storage unit 19, and the memory usage amount stored in the memory usage amount storage unit 15. In a maximum thread number storage unit 16, the predetermined maximum number of the threads 12 that are able to belong to the process 11 is stored as a maximum thread number. The management unit 13 adds (generates) a thread 12 so that the number of the threads 12 does not exceed the maximum thread number.

The communication unit 40 is provided with a function to determine which process among the plurality of processes 11 to pass a request received from the client terminal 30. The request is, for example, a request to retrieve data in the database 60, or a request to update data.

When receiving a request from the communication unit 40, the management unit 13 passes the request to a waiting thread 12 that is waiting in preparation for subsequent processing. The thread 12 that receives the request starts processing corresponding to the request. When the thread 12 starts processing, the management unit 13 acquires a start time that is the current time at that time, from a clock mechanism (not illustrated) built into the server device 10. The management unit 13 then associates the start time with the thread identification information of the thread 12 that starts processing, and writes the start time in a thread start time storage unit 18. Furthermore, since the number of the waiting threads 12 decreases, the management unit 13 updates the number of waiting threads that is stored in the waiting thread number storage unit 14 in the memory 50, in accordance with the change in the number of waiting threads. When completing processing, the thread 12 passes the processing result (response) to the management unit 13. The management unit 13 transmits back the processing result (response) to the client terminal 30 via the communication unit 40.

At the time of receiving a request, when all of the threads 12 belonging to the process 11 are processing other requests (in other words, when there is no waiting thread 12), the management unit 13 generates the new thread 12. However, the management unit 13 is not able to generate the thread 12 when the number of the threads 12 belonging to the process 11 reaches the maximum thread number stored in the maximum thread number storage unit 16. In this case, the management unit 13 holds the request. Thereafter, when detecting presence of the thread 12 that completes processing and is waiting in preparation for subsequent processing, the management unit 13 passes the held request to the thread 12. Note that time information regarding a predetermined processing interval (waiting time) is stored in a processing interval storage unit 17 in the memory 50. It is not possible for the thread 12 to start subsequent processing after completing processing until the time of the processing interval elapses.

When there is no held request and the total number of threads exceeds the initial value, the management unit 13 deletes the thread that completes processing and is waiting. Also in this case, the management unit 13 updates the total number of threads that is stored in the thread total number storage unit 19, in accordance with the change in the number of threads belonging to the process 11. Furthermore, because of decrease in the region used by the threads 12 in the storage region in the memory 50 allocated to the process 11, the management unit 13 updates the memory usage amount stored in the memory usage amount storage unit 15.

Figure 5:
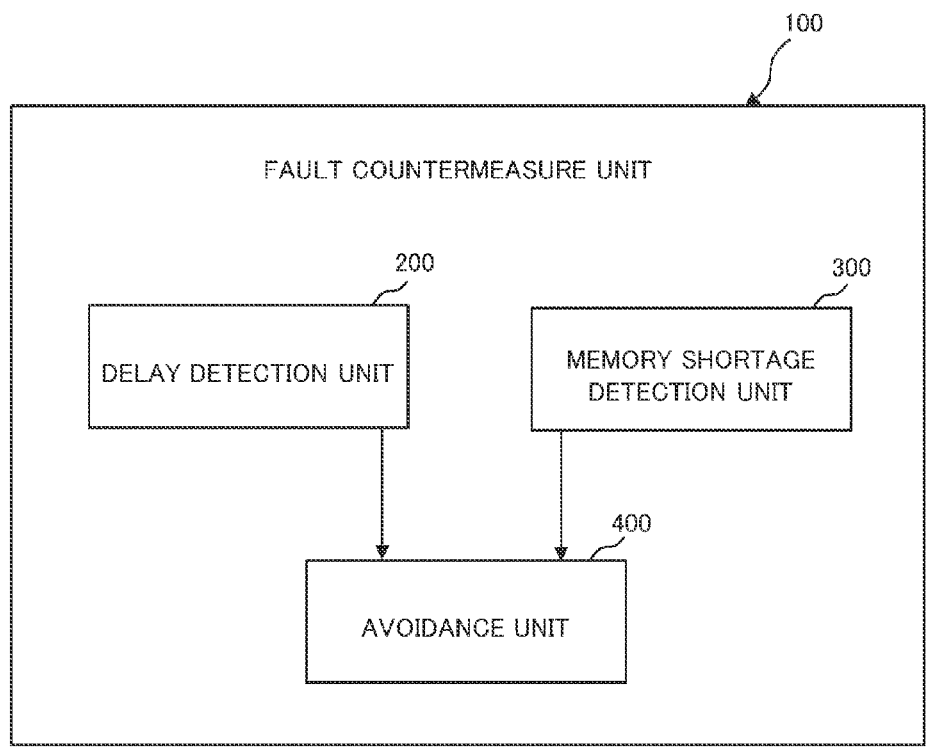
FIG. 5 is a block diagram illustrating a configuration of a fault countermeasure unit in the fourth exemplary embodiment.

FIG. 5 is a block diagram depicting, in a simplified manner, one configuration example of the fault countermeasure unit 100. In this fourth exemplary embodiment, the fault countermeasure unit 100 includes a delay detection unit 200 that is a detection unit (detection means), a memory shortage detection unit 300 that is a detection unit (detection means), and an avoidance unit (avoidance means) 400.

Figure 6:
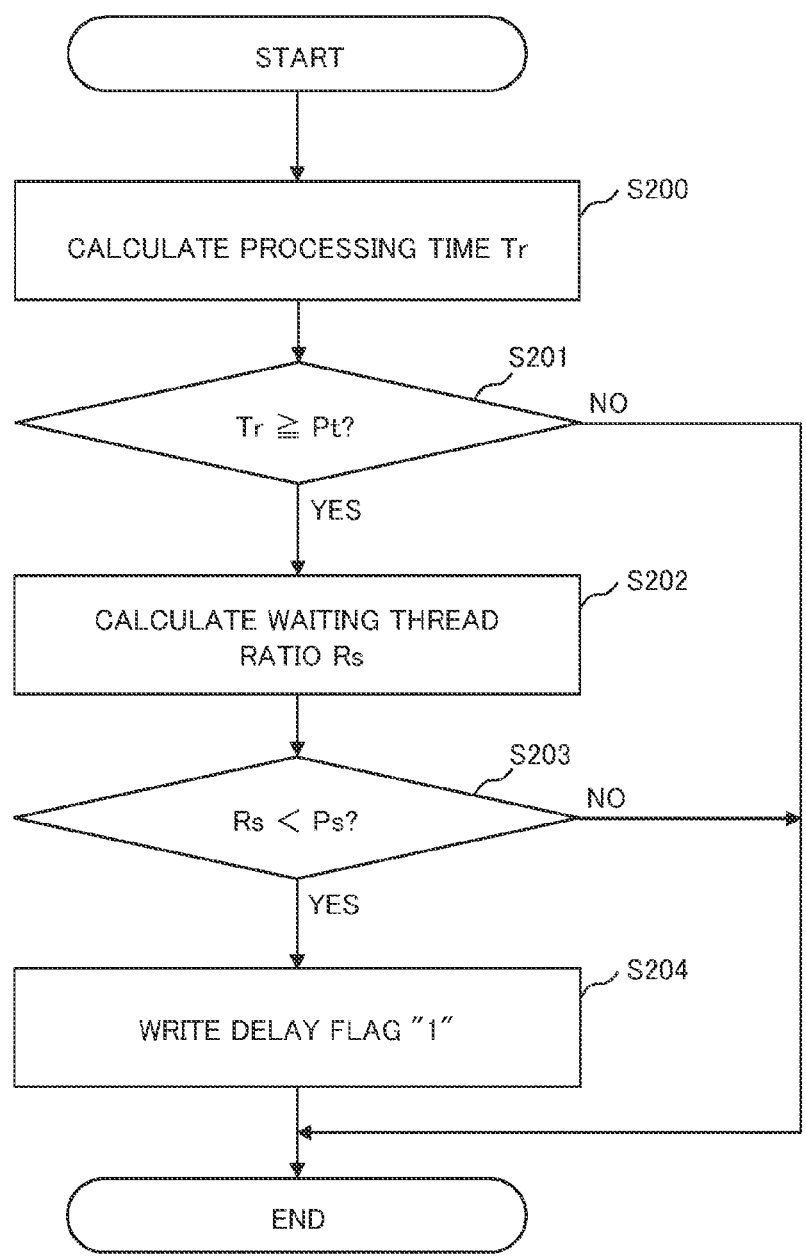
FIG. 6 is a flowchart depicting an operation example of a delay detection unit in the fourth exemplary embodiment.

The delay detection unit 200 is provided with a function to detect that processing of the thread 12 is delayed. FIG. 6 is a flowchart depicting an operation example of the delay detection unit 200. An operation example of the delay detection unit 200 is described using this flowchart.

In this fourth exemplary embodiment, when the management unit 13 detects that processing of the thread 12 is completed, the delay detection unit 200 is notified of the identification information of the thread 12 that completes processing. Based on the received thread identification information, the delay detection unit 200 reads, from the thread start time storage unit 18, information regarding the time when the thread 12 that completes processing starts the processing. Furthermore, the delay detection unit 200 reads information regarding the time when the thread 12 completes processing, for example, from the clock mechanism. Based on the obtained time information, the delay detection unit 200 then calculates the processing time Ti spent from the time when the thread 12 starts processing until completing the processing (Step S200 in FIG. 6).

Next, the delay detection unit 200 compares the calculated processing time Tr with the upper limit Pt (40 seconds, for example) that is the delay threshold value provided in advance, and determines whether or not the processing time Tr is equal to or greater than the upper limit Pt (Step S201). As a result of this determination, when determining that the processing time Tr is less than the upper limit Pt, the delay detection unit 200 determines that processing of the thread 12 is not delayed, and terminates the operation. On the other hand, when determining that the processing time Tr is equal to or greater than the upper limit Pt, the delay detection unit 200 determines that there is a high probability that processing of the thread 12 is delayed. The delay detection unit 200 subsequently executes processing such as the following. The delay detection unit 200 reads the total number of threads that is stored in the thread total number storage unit 19. Furthermore, the delay detection unit 200 reads the number of waiting threads that is stored in the waiting thread number storage unit 14. The delay detection unit 200 then calculates, as the waiting thread ratio Rs, the ratio of the number of waiting threads St with respect to the total number of threads Sa (Step S202).

Thereafter, the delay detection unit 200 compares the waiting thread ratio Rs with a predetermined, lower limit Ps (10%, for example), and determines whether or not the waiting thread ratio Rs is less than the lower limit Ps (Step S203). As a result of this determination, when determining that the waiting thread ratio Rs is equal to or greater than the lower limit Ps, the delay detection unit 200 determines that a risk is low for the fault occurrence caused by the processing delay of the thread 12, and terminates the operation. In contrast, when determining that the waiting thread ratio Rs is less than the lower limit Ps, the delay detection unit 200 determines that the fault is liable to occur. In this case, the delay detection unit 200 writes a numerical value "1" serving as a delay flag indicating the detection that the fault caused by the processing delay is liable to occur, for example, in a delay flag storage unit (not illustrated) provided in the memory 50 (Step S204). Thereby, the delay detection unit 200 terminates the operation.

The delay detection unit 200 repeatedly executes the aforementioned operation whenever the thread 12 completes processing.

Figure 7:
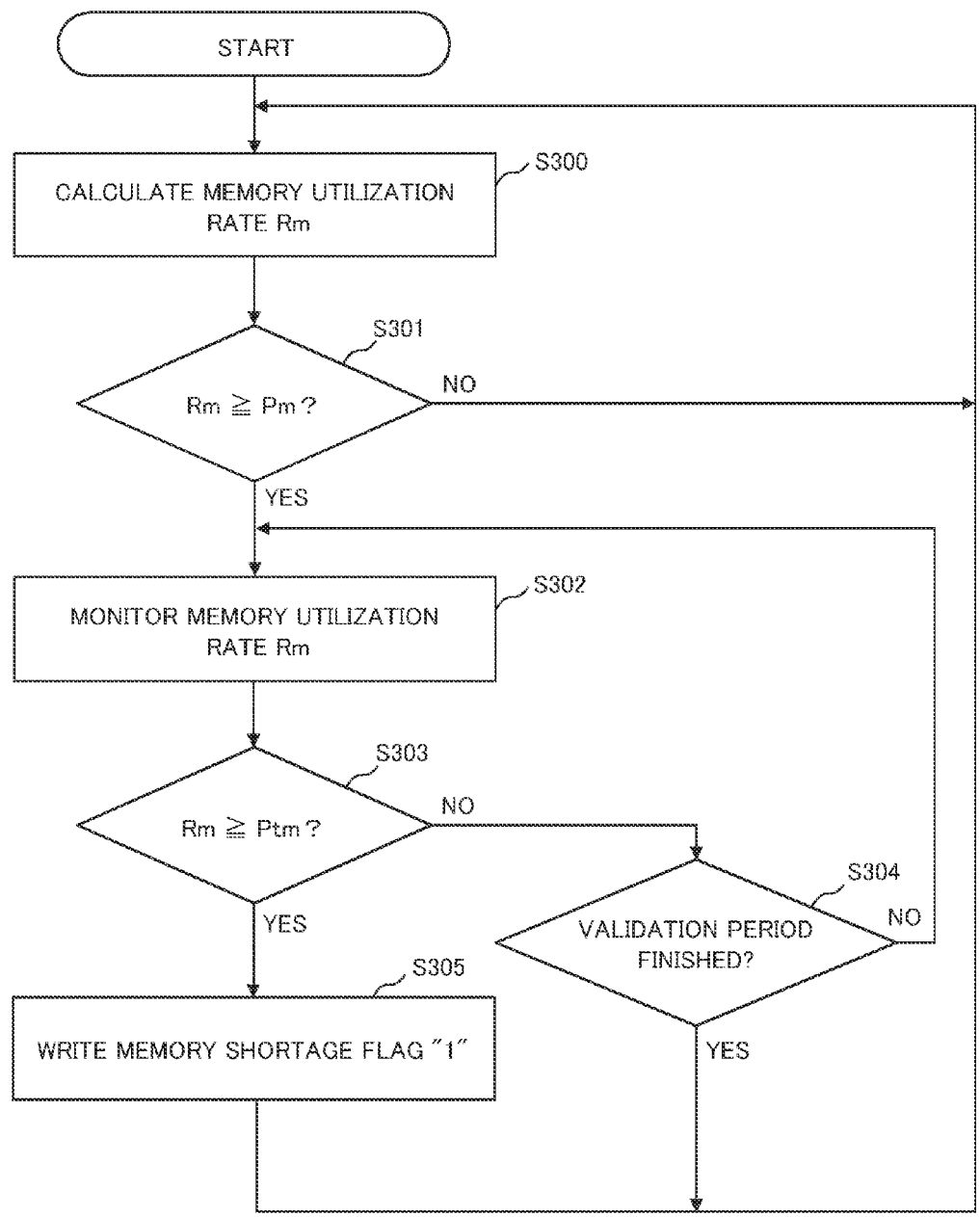
FIG. 7 is a flowchart depicting an operation example of a memory shortage detection unit in the fourth exemplary embodiment.

The memory shortage detection unit 300 is provided with a function to detect a state where it is likely that the fault occurs due to the memory shortage in the memory 50. FIG. 7 is a flowchart depicting an operation example memory shortage detection unit 300. An operation example of the memory shortage detection unit 300 is described using this flowchart.

At each predetermined normal monitoring time interval Th (600 seconds, for example), the memory shortage detection unit 300 reads the memory usage amount m of the process 11 that is stored in the memory usage amount storage unit 15 in the memory 50. The memory shortage detection unit 300 then calculates the memory utilization rate Rm that is the ratio of the memory usage amount with respect to the capacity (allocated capacity) M of the storage region allocated to the process 11 (Step S300 in FIG. 7). Thereafter, the memory shortage detection unit 300 compares the calculated memory utilization rate Rm with the memory threshold value Pm, and determines whether or not the memory utilization rate Rm is equal to or greater than the memory threshold value Pm (Step S301). When determining that the memory utilization rate Rm is less than the memory threshold value Pm, the memory shortage detection unit 300 determines that a risk is low for the fault occurrence caused by the memory shortage, and prepares for next calculation of the memory utilization rate Rm. When reaching a calculation timing, the memory shortage detection unit 300 repeats the operation of Step S300 and thereafter.

In contrast, in Step S301, when determining that the memory utilization rate Rm is equal to or greater than the memory threshold value Pm, the memory shortage detection unit 300 shortens the time interval for calculating the memory utilization rate Rm. In other words, the memory shortage detection unit 300 calculates the memory utilization rate Rm at each validation monitoring time interval Ts (60 seconds, for example), as previously described (Step S302). The memory shortage detection unit 300 then compares the calculated memory utilization rate Rm with a memory upper limit Ptm provided in advance, and determines whether or not the memory utilization rate Rm is equal to or greater than the memory upper limit Pt in (Step S303). The memory upper limit Ptm is a numerical value that is greater than the memory threshold value Pm.

As a result of this determination, when determining that the memory utilization rate Rm is less than the memory upper limit Ptm, the memory shortage detection unit 300 determines risk is low for the fault occurrence caused by the memory shortage, and performs an operation described in the following. Specifically, the memory shortage detection unit 300 determines whether or not a set validation period elapses from the time when the memory utilization rate Rm starts to be calculated at each validation monitoring time interval Ts (Step S304). Thus, when determining that the validation period does not elapse, the memory shortage detection unit 300 repeats the operation of Step S302 and thereafter. Furthermore, when determining that the validation period elapses, the memory shortage detection unit 300 repeats the operation of Step S300 and thereafter.

On the other hand, when determining by the operation of Step S303 that the memory utilization rate Rm is equal to or greater than the memory upper limit Ptm, the memory shortage detection unit 300 determines that the fault is liable to occur in the server device 10 due to the memory shortage. The memory shortage detection unit 300 then writes a numerical value "1" serving as a memory shortage flag indicating detection that the fault caused by the memory shortage is liable to occur, for example, in the memory shortage flag storage unit (not illustrated) provided in the memory 50 (Step S305). Thereafter, the memory shortage detection unit 300 repeats the operation of Step S300 and thereafter.

The avoidance unit 400 is provided with a function to avoid, the fault occurring in the server device 10 based on the detection results of the delay detection unit 200 and the memory shortage detection unit 300. FIG. 8 is a flowchart depicting an operation example of the avoidance unit 400. An operation example of the avoidance unit 400 is described using this flowchart.

In this fourth exemplary embodiment, the avoidance unit 400 monitors the state of flags written in the delay flag storage unit and the memory shortage flag storage unit. With this monitoring, the avoidance unit 400 determines whether or not a numerical value "1" serving as a flag is written (whether there is a flag) in at least one of the delay flag storage unit and the memory shortage flag storage unit (Step S400). Thus, when detecting that there is the flag, the avoidance unit 400 checks the state of a delay avoidance flag storage unit (not illustrated) and the memory shortage avoidance flag storage unit (not illustrated) that are provided in the memory 50. The delay avoidance flag storage unit is a storage region in which a numerical value "1" serving as a flag is to be written when the avoidance unit 400 executes fault occurrence avoidance processing based on detection that the delay in processing of the thread 12 is occurring. The memory shortage avoidance flag storage unit is a storage region in which a numerical value "1" serving as a flag is to be written when the avoidance unit 400 executes fault occurrence avoidance processing based on detection of the memory shortage.

The avoidance unit 400 checks the delay avoidance flag storage unit and the memory shortage avoidance flaw storage unit to thereby determine whether or not "1" serving as a flag is not written (whether there is no flag) in both of those storage units (Step S401). As a result of this determination, when determining that the flag "1" is not written in both of those storage units, the avoidance unit 400 executes fault avoidance processing since the fault avoidance processing is not yet executed (Step S402). In other words, the avoidance unit 400 changes the maximum thread number to be low, and the processing interval (waiting time) of the thread 12 to extend.

Thereafter, the avoidance unit 400 determines whether or not a numerical value "1" serving as a flag is written (whether there is a flag) in the delay flag storage unit (Step S403). In other words, the avoidance unit 400 determines whether the processing delay is detected by the delay detection unit 200 and whether the memory shortage is detected by the memory shortage detection unit 300.

When there is the flag "1" in the delay flag storage unit, the avoidance unit 400 writes "1" serving as a flag in the delay avoidance flag storage unit (Step S404). Thereafter, when detecting that any of the threads 12 complete processing based on operation information (management information) of the management unit 13, the avoidance unit 400 calculates the processing time Tr spent for the processing. In addition, the avoidance unit 400 compares the calculated processing time Tr with the upper limit Pt (40 seconds, for example), and determines whether or not the processing time Tr is equal to or less than the upper limit Pt (Step S405). As a result of this determination, when determining that the processing time Tr is longer than the upper limit Pt, the avoidance unit 400 repeats calculating the processing time Tr and comparing the processing time Tr with the upper limit Pt.

When determining that the processing time Tr is equal to or less than the upper limit Pt, the avoidance unit 400 deletes the "1" written as a flag in the delay avoidance flag storage unit, and writes "0", for example (Step S406).

On the other hand, when determining by the determination operation of Step S403 that a numerical value "1" serving as a flag is written in the memory shortage flag storage unit, the avoidance unit 400 writes a numerical value "1" as a flag in the memory shortage avoidance flag storage unit (Step S407). Thereafter, the avoidance unit 400 calculates the memory utilization rate Rm at each validation monitoring time interval Ts. The avoidance unit 400 then determines whether or not the calculated memory utilization rate Rm is less than the memory threshold value Pm (Step S408). When determining that the memory utilization rate Rm is equal to or greater than the memory threshold value Pm, the avoidance unit 400 repeats calculating the memory utilization rate Rm and comparing the memory utilization rate Rm with the memory threshold value Pm. Furthermore, when determining that the memory utilization rate Rm is less than the memory threshold value Pm, the avoidance unit 400 deletes the "1" written as a flag in the memory shortage avoidance flag storage unit, and writes "0", for example (Step S409).

Note that, when the flag "1" is written in both the delay flag storage unit and the memory shortage flag storage unit in Step S403, the avoidance unit 400 executes, in parallel, operations from Steps S404 to S406, and operations from Steps S407 to S409.

Thereafter, the avoidance unit 400 determines whether or not "1" serving as a flag is not written (whether there is no flag) in both the delay avoidance flag storage unit and the memory shortage avoidance flag storage unit (Step S410). In other words, the avoidance unit 400 confirms that a state where the fault is liable to occur (fault concern state) is eliminated. The avoidance unit 400 then releases the fault avoidance state (Step S411). In other words, the avoidance unit 400 returns the maximum thread number and the thread processing time interval to the original numerical values. The avoidance unit 400 then deletes the "1" written as a flag in the delay flag storage unit and the memory shortage flag storage unit, and writes "0", for example.

In this way, the avoidance unit 401) executes operations relating to the fault avoidance processing.

The server device 10 of the fourth exemplary embodiment is configured as described above. The same effect as that of the information processing devices of the first to third exemplary embodiments is able to be achieved also in the server device of this fourth exemplary embodiment.

Fifth Exemplary Embodiment

Hereinafter, a fifth embodiment is described. Note that, in this fifth exemplary embodiment, the same reference symbols are appended to portions having the same names as in the fourth exemplary embodiment, and overlapping descriptions of those common portions are omitted.

In this fifth exemplary embodiment, a condition by which the avoidance unit 400 executes fault avoidance processing is different from that in the fourth exemplary embodiment. Specifically, in the fourth exemplary embodiment, the avoidance unit 400 executes fault avoidance processing when detecting either the delay in processing of the thread 12 or the memory shortage. In contrast, in this fifth exemplary embodiment, the avoidance unit 400 executes fault avoidance processing only when detecting and confirming both the delay in processing of the thread 12 and the memory shortage within a predetermined time (100 seconds, for example).

A configuration of the server device 10 other than the above is the same as that of the server device 10 of the fourth exemplary embodiment. The same effect as that of the server device 10 of the fourth exemplary embodiment is able to be achieved also in the server device 10 of this fifth exemplary embodiment.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

It is possible for a part of or all of the aforementioned exemplary embodiments to be described also as in the following Supplemental Notes; however, they are not limited, to the following.

(Supplemental Note 1)

An information processing device including:

a process that is generated when a program is executed and is an execution unit of a program;

a plurality of threads that are generated in the process and are processing units of the process; and a fault countermeasure unit, and further including:

a thread start time storage unit that stores thread identification information that identifies each of the threads and processing start time information that indicates a time at which a thread specified by the thread identification information starts processing, associated with each other;

a maximum thread number storage unit that stores, as a maximum thread number, a value that indicates a maximum number of the threads that are able to be generated when generation of the threads in a number exceeding a predetermined number is needed in the process; and a processing interval storage unit that stores, as a processing interval, a value that indicates a time period from a time at which the thread completes processing to a time at which the thread becomes in a state to be able to execute subsequent processing, wherein the fault countermeasure unit includes:

an avoidance unit; and a delay detection unit that is provided with a function to, when any of the threads complete processing, calculate a time spent for the processing based on a current time and the processing start time information stored in association with the thread identification information of the thread, and the avoidance unit executes fault avoidance processing that alters the maximum thread number stored. In the maximum thread number storage unit from a predetermined first value to a predetermined second value that is less than the first value, and alters the processing interval stored in the processing interval storage unit from a predetermined third value to a predetermined fourth value that is greater than the third value, in a case where a processing time calculated by the delay detection unit when any of the threads complete processing is equal to or greater than a predetermined, first time.

(Supplemental Note 2)

An information processing device including:

a process that is generated when a program is executed and is an execution unit of a program;

a plurality of threads that are generated in the process and are processing units of the process; and a fault countermeasure unit, and further including:

a thread total number storage unit that stores a value that indicates a total number of the threads belonging to the process;

a thread start time storage unit that stores thread identification information that identifies the threads and processing start time information that indicates a time at which the thread specified by the thread identification information starts processing, associated with each other;

a maximum thread number storage unit that stores, as a maximum thread number, a value that indicates a maximum number of threads that are able to be generated when generation of threads in a number exceeding a predetermined number is needed in the process;

a processing interval storage unit that stores, as a processing interval, a value that indicates a time period from a time at which the thread completes processing to a time at which the thread becomes in a state to be able to execute subsequent processing; and a waiting thread number storage unit that stores, as a number of waiting threads, a value that indicates a number of the threads that are waiting in preparation for subsequent processing, wherein the fault countermeasure unit includes:

an avoidance unit; and a delay detection unit that is provided with a function to, when any of the threads complete processing, calculate a time spent the processing based on a current time and the processing start time information stored in association with the thread identification information that identifies the thread in the thread start time storage unit, and a function to calculate, as a waiting thread ratio, a ratio of a number of waiting threads stored in the waiting thread number storage unit with respect to a total number of the threads stored in the thread total number storage unit, when any of the threads complete processing, and the avoidance unit executes fault avoidance processing that alters the maximum thread number stored in the maximum thread number storage unit from a predetermined first value to a predetermined second value that is less than the first value, and alters the processing interval stored in the processing interval storage unit from a predetermined third value to a predetermined fourth value that is greater than the third value, in a case where the thread processing time calculated by the delay detection unit when any of the threads complete processing is equal to or greater than a predetermined, first time, and a waiting thread ratio calculated by the delay detection unit when the thread completes processing is less than a predetermined value.

(Supplemental Note 3)

The information processing device according to Supplemental Note 1 or 2, wherein the avoidance unit executes, after execution of the fault avoidance processing, recovery processing that alters the maximum thread number stored in the maximum thread number storage unit from the second value to the first value, and alters the processing interval stored in the processing interval storage unit from the fourth value to the third value, in a case where the processing time is equal to or less than a predetermined second time that is shorter than the first time when any of the threads complete processing.

(Supplemental Note 4)

An information processing device including:

a process that is generated when a program is executed and is an execution unit of a program;

a plurality of threads that are generated in the process and are processing units of the process;

a fault countermeasure unit; and a storage unit including a storage region that is allocated, to the process, wherein the storage unit stores:

an allocated capacity that is a capacity of a storage region within the storage unit allocated to the process;

a memory usage amount that is a capacity of a storage region being used by the process;

a maximum thread number that is a value indicating a maximum number of threads being able to be generated by the process; and a processing interval that is a time period from a time at which the thread completes processing to a time at which the thread becomes in a state to be able to execute subsequent processing, the fault countermeasure unit includes:

an avoidance unit; and a memory shortage detection unit provided with a function to calculate a memory utilization rate that is a ratio of the memory usage amount with respect to the allocated capacity, and the avoidance unit executes fault avoidance processing that alters the maximum thread number of the process from a predetermined third value to a predetermined fourth value that is less than the third value, and alters a processing interval of the thread from a predetermined fifth value to a predetermined sixth value that is greater than the fifth value, in a case where the memory shortage detection unit calculates the memory utilization rate in each predetermined first time interval, and when the calculated memory utilization rate becomes equal to or greater than a predetermined first value, the memory shortage detection unit starts to calculate the memory utilization rate in each predetermined second time interval that is shorter than the first time interval, and the memory utilization rate does not become equal to or less than a predetermined second value that is greater than the first value before a predetermined time period elapses.

(Supplemental Note 5)

The information processing device according to Supplemental Note 4, wherein the avoidance unit executes recovery processing that alters the maximum thread number of the process from the fourth value to the third value, and alters the processing interval of the thread from the sixth value to the fifth value, in a case where the memory shortage detection unit calculates the memory utilization rate in each of the second time interval after execution of the fault avoidance processing, and this calculated memory utilization rate becomes less than the first value.

(Supplemental Note 6)

An information processing device including:

a process that is generated when a program is executed and is an execution unit of a program;

a plurality of threads that are generated in the process and are processing units of the process;

a fault countermeasure unit; and a storage unit including a storage region that is allocated to the process, wherein the storage region stores:

an allocated capacity that is a capacity of the storage region allocated to the process;

a memory usage amount that is a capacity of a storage region being used by the process;

processing start time information that is associated with thread identification information identifying the thread, and indicates a time at which a thread specified by the thread identification information starts processing;

a maximum thread number that is a maximum number of threads being able to be generated by the process; and a processing interval that is a time period from a time at which the thread completes processing to a time at which the thread becomes in a state to be able to execute subsequent processing, the fault countermeasure unit includes:

an avoidance unit;

a memory shortage detection unit provided with a function to calculate a memory utilization is a ratio of the memory usage amount with respect to the allocated capacity of the process; and a delay detection unit provided with a function to, when any of the threads complete processing, calculate a processing time spent for the processing based on a current time and the processing start time information associated with the thread identification information of the thread, and the avoidance unit executes fault avoidance processing that alters the maximum thread number of the process from a predetermined fourth value to a predetermined fifth value that is less than the fourth value, and alters the processing interval of the thread from a predetermined sixth value to a predetermined seventh value that is greater than the sixth value, only when a first condition that, when any of the threads complete processing, the processing time is equal to or greater than a predetermined first time, and a second condition that the memory utilization rate is calculated in each predetermined first time interval, and when the calculated memory utilization rate becomes equal to or greater than a predetermined first value, the memory utilization rate is started to be calculated in each predetermined second time interval that is shorter than the first time interval, and the memory utilization rate does not become equal to or less than a predetermined second value that is greater than the first value before a predetermined time period elapses, are satisfied, within a predetermined confirmation time.

(Supplemental Note 7)

An information processing device including:

a process that is generated when a program is executed and is an execution unit of a program;

a plurality of threads that are generated in the process and are processing units of the process;

a fault countermeasure unit; and a storage unit including a storage region that is allocated to the process, wherein the storage unit stores:

a total number of the threads belonging to the process;

a processing start time that is associated with thread identification information identifying the thread, and indicates a time at which a thread specified by the thread identification information starts processing;

a maximum thread number that is a maximum number of threads being able to be generated by the process;

a processing interval that is a time period from a time at which the thread completes processing to a time at which the thread becomes in a state to be able to execute subsequent processing;

an allocated capacity that is a capacity of a storage region within the storage unit allocated to the process; and a memory usage amount that is a capacity of a storage region being used by the process, the fault countermeasure unit includes:

an avoidance unit;

a memory shortage detection unit provided with a function to calculate a memory utilization rate that is a ratio of the memory usage amount with respect to the allocated capacity in the process; and a delay detection unit provided with a function to, when any of the threads complete processing, calculate a processing time spent for the processing based on a current time and the processing start time information associated with the thread identification information of the thread, and a function to calculate, as a waiting thread ratio, a ratio of a number of the threads that are waiting in preparation for subsequent processing with respect to a total number of the threads generated in the process, when any of the threads complete processing, and the avoidance unit executes fault avoidance processing that alters the maximum thread number of the process from a predetermined fourth value to a predetermined fifth value that is less than the fourth value, and alters the processing interval of the process from a predetermined sixth value to a predetermined seventh value that is greater than the sixth value, only when a first condition that, when any of the threads complete processing, the processing time spent for the processing is equal to or greater than a predetermined first time, and that the waiting thread ratio is less than a predetermined first value, and a second condition that the memory shortage detection unit calculates the memory utilization rate in each predetermined first time interval, and when this calculated memory utilization rate becomes equal to or greater than a predetermined second value, the memory shortage detection unit starts to calculate the memory utilization rate in each predetermined, second time interval that is shorter than the first time interval, and the memory utilization rate does not become equal to or less than a predetermined, third value that is greater than the second value before a predetermined time period elapses are satisfied, within a predetermined confirmation time.

(Supplemental Note 8)

The information processing device according to Supplemental Note 6 or 7, wherein the avoidance unit executes, after execution of the fault avoidance processing, recovery processing that alters the maximum thread number of the process from the fifth value to the fourth value, and alters the processing interval of the thread from the seventh value to the sixth value, only when a third condition that, when any of the threads belonging to the process complete processing, the processing time spent for the processing is equal to or less than a predetermined, second time that is shorter than the first time, and a fourth condition that the memory shortage detection unit calculates the memory utilization rate in each of the second time interval, and this calculated memory utilization rate is less than the first value are satisfied.

(Supplemental Note 9)

A fault avoidance method including:

generating, when a program is executed, a process that is an execution unit of the program;

generating a plurality of threads that belong to the process and are execution units of the process;

calculating, when any of the threads complete processing, a processing time spent for the processing based on a current time and processing start time information that is associated with thread identification information identifying the thread and is stored in a storage unit;

calculating, as a waiting thread ratio, a ratio of a number of the threads that are waiting in preparation for subsequent processing with respect to a total number of the threads belonging to the process, when any of the threads complete processing; and altering the maximum thread number of the process to become smaller, and altering the processing interval of the process to become longer, when the calculated processing time is equal to or greater than a predetermined time, and a waiting thread ratio is less than a predetermined value.

(Supplemental Note 10)

A fault avoidance method including:

generating, when a program is executed, a process that is an execution unit of the program;

calculating, in each predetermined first time interval, a memory utilization rate that is a ratio of a memory usage amount that is a storage capacity being used, with respect to a storage capacity of a storage region allocated to the process;

altering a maximum number of threads that are able to belong to the process to become smaller, and altering a processing interval from a time at which the thread complete processing to a time at which the thread becomes in a state to be able to execute subsequent processing to become longer, in a case where the memory utilization rate is started to be calculated in each predetermined second time interval that is shorter than the first time interval when the memory utilization rate becomes equal to or greater than a predetermined first value, and the memory utilization rate does not become equal to or less than a predetermined second value that is greater than the first value, before a predetermined time period elapses.

The invention claimed is:

1. An information processing device, comprising: a central processing unit; and a data storage device, the data storage device having program code executable by the information processing device that, upon execution by the information processing device, causes the information processing device to function as: a detection unit that detects a state where a fault is likely to occur based on one or both of a utilization rate of memory capacity allocated to a process that is a unit in which a computer program is executed, and a processing time spent by a thread, which is generated by the process and is a unit in which processing corresponding to a request received by the process is executed, to perform the processing; and an avoidance unit that executes fault avoidance processing that louvers an upper limit number of the threads that are generated by the process and are able to belong to the process, from a standard value to a limit value that is less than the standard value, and extends a waiting time that the thread has to wait after completing processing until starting separate processing, from a standard time to an extended time that is longer than the standard time, when a state where a fault is likely to occur is detected.

2. The information processing device according to claim 1, wherein the detection unit detects the state where the fault is likely to occur, when a processing time of the thread is delayed by a predetermined delay threshold value or more.

3. The information processing device according to claim 1, wherein the detection unit detects the state where the fault is likely to occur, when a utilization rate of the memory capacity rises to a predetermined memory threshold value or more.

4. The information processing device according to claim 1, wherein the detection unit further includes a function to, when detecting the state where the fault is likely to occur, monitor the processing time of the threads or the utilization rate of the memory capacity, and validate whether or not the detection is correct based on the monitoring result, and the avoidance unit executes the fault avoidance processing when the state where the fault is likely to occur is confirmed as a result of validation by the detection unit.

5. The information processing device according to claim 4, wherein the detection unit monitors, when there are a plurality of the threads generated by the process and belonging to the process, and when the detection based on the processing time of the thread is to be validated, the processing time of each of the threads across a predetermined delay validation period, calculates, as a waiting ratio, a ratio of a number of the threads that are waiting with respect to a total number of the threads belonging to the process, and validates the detection based on a processing time of each of the threads and the waiting ratio.

6. The information processing device according to claim 4, wherein the detection unit acquires, when the state where the fault is likely to occur is detected by a fact that the utilization rate of the memory capacity acquired in each predetermined time interval rises to a memory threshold value or more, and when the detection is to be validated, the utilization rate of the memory capacity in each time interval that is shorter than a time interval in which the utilization rate of the memory capacity is acquired, and validates the detection based on the utilization rate of the acquired memory capacity.

7. The information processing device according to claim 1, wherein
the avoidance unit executes fault avoidance processing when the state where the fault is likely to occur is detected by the detection unit based on one of the utilization rate of the memory capacity and the processing time of the thread, and then, before a predetermined time period elapses, the state where the fault is likely to occur is detected based on the other of the utilization rate of the memory capacity and the processing time of the thread.

8. The information processing device according to claim 1, further comprising a return unit that monitors the utilization rate of the memory capacity or the processing time of the thread after the avoidance unit executes the fault avoidance processing, and returns the upper limit number of the threads to the standard value and also returns the waiting time of the thread to the standard time when a predetermined improvement state is detected as a result of the monitoring.

9. An information processing device, comprising: a central processing unit; and a data storage device, the data storage device having program code executable by the information processsing device that, upon execution by the information processing device, causes the information processing device to function as: detection means for detecting a state where a fault is likely to occur based on one or both of a utilization rate of memory capacity allocated to a process that is a unit in which a computer program is executed, and a processing time spent by a thread, which is generated by the process and is a unit in which processing corresponding to a request received by the process is executed, to perform the processing; and avoidance means for executing fault avoidance processing that lowers an upper limit number of the threads that are generated by the process and are able to belong to the process, from a standard value to a limit value that is less than the standard value, and extends a waiting time that the thread has to wait after completing processing until starting separate processing, from a standard time to an extended time that is longer than the standard time, when a state where a fault is likely to occur is detected.

10. A fault avoidance method, comprising:

detecting, by a computer, a state where a fault is likely to occur based on one or both of a utilization rate of memory capacity allocated to a process that is a unit in which a computer program is executed, and a processing time spent by a thread which is generated by the process and is a unit in which processing corresponding to a request received by the process is executed, to perform the processing, and lowering, by a computer, an upper limit number of the threads that are generated by the process and are able to belong to the process, from a standard value to a limit value that is less than the standard value, and a computer extends a waiting time that the thread has to wait after completing processing until starting separate processing, from a standard time to an extended time that is longer than the standard time, when a state where a fault is likely to occur is detected.

11. A non-transitory program storage medium that retains a computer program that causes a computer to execute:

processing of detecting a state where a fault is likely to occur based on one or both of a utilization rate of memory capacity allocated to a process that is a unit in which a computer program is executed, and a processing time spent by a thread, which is generated by the process and is a unit in which processing corresponding to a request received by the process is executed, to perform the processing; and processing of a computer lowering an upper limit number of the threads that are generated by the process and are able to belong to the process, from a standard value to a limit value that is less than the standard value, and extending a waiting time that the thread has to wait after completing processing until starting separate processing, from a standard time to an extended time that is longer than the standard time, when a state where a fault is likely to occur is detected.

* * * * *